United States Patent
Beattie, Jr. et al.

(10) Patent No.: US 8,848,657 B2
(45) Date of Patent: Sep. 30, 2014

(54) METHOD AND APPARATUS FOR DETECTING SILENT GAPS IN WIRELESS NETWORK SERVICE

(75) Inventors: James G. Beattie, Jr., Bergenfield, NJ (US); Debebe A. Asefa, Eatontown, NJ (US); Stephen J. Griesmer, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 873 days.

(21) Appl. No.: 12/634,369

(22) Filed: Dec. 9, 2009

(65) Prior Publication Data

US 2011/0136486 A1    Jun. 9, 2011

(51) Int. Cl.
*H04W 4/00* (2009.01)
*H04W 24/00* (2009.01)
*H04W 28/04* (2009.01)

(52) U.S. Cl.
CPC ............. *H04W 24/00* (2013.01); *H04W 28/04* (2013.01)

USPC ........................................... 370/331

(58) Field of Classification Search
USPC .............. 370/242–244, 331; 455/423–424, 455/436–444
See application file for complete search history.

(56) References Cited

U.S. PATENT DOCUMENTS

| | | | |
|---|---|---|---|
| 6,442,388 B1 * | 8/2002 | Lopez et al. | 455/436 |
| 6,463,287 B1 * | 10/2002 | Wegner | 455/456.1 |
| 6,671,265 B1 * | 12/2003 | Hwang et al. | 370/331 |
| 2009/0082007 A1 * | 3/2009 | De Benedittis et al. | 455/423 |

* cited by examiner

*Primary Examiner* — Peter Cheng

(57) ABSTRACT

In one embodiment, the present disclosure is a method and apparatus for detecting silent gaps in wireless network service. In one embodiment, a method for detecting gaps in the service of a wireless network includes monitoring a series of control messages exchanged between a first mobile switching center and a second mobile switching center in the wireless network, where the series of control messages relate to a handoff of a wireless device being served by the wireless network and logging any errors detected during the exchange of the control messages.

5 Claims, 3 Drawing Sheets

US 8,848,657 B2

METHOD AND APPARATUS FOR DETECTING SILENT GAPS IN WIRELESS NETWORK SERVICE

FIELD OF THE DISCLOSURE

The present disclosure relates generally to wireless communications and relates more particularly to methods for detecting gaps in wireless network service.

BACKGROUND

A typical wireless device (e.g., a mobile phone) periodically monitors the signal quality of the cell by which it is currently being served, as well as the signal qualities of neighboring cells. If the wireless device detects a neighboring cell having a stronger signal than the cell by which it is currently being served, the wireless device will initiate a switch to the neighboring cell. If the current cell and the neighboring cell are co-located (e.g., controlled by the same mobile switching center), then it is relatively simple to make the switch. However, if the current cell and the neighboring cell are not co-located, then registration loss and subsequent gaps in tracking among communities of user devices may occur unnoticed by network management and field services technicians. These registration losses and gaps are considered "silent" because they are typically viewed as isolated instances (rather than indications of larger, persistent problems) and thus are not reported.

Registration loss and silent gaps in tracking may be the result of a failure of a network service component which has failed to trigger an alarm. Registration loss and/or gaps could also be caused by failed wireless device location updates, the assignment of channels that are already serving other wireless devices, failed set asynchronous balanced mode (SABM) signals to initiate radio connections, failed authentication of a wireless device, or failed unnumbered acknowledge (UA) messages. If the resulting registration losses and/or gaps are not reported, the failures may persist for some time, requiring wireless device users to frequently re-register and/or to make new calls.

SUMMARY

In one embodiment, the present disclosure is a method and apparatus for detecting silent gaps in wireless network service. In one embodiment, a method for detecting gaps in the service of a wireless network includes monitoring a series of control messages exchanged between a first mobile switching center and a second mobile switching center in the wireless network, where the series of control messages relate to a handoff of a wireless device being served by the wireless network and logging any errors detected during the exchange of the control messages.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for detecting silent gaps in wireless network service. Embodiments of the invention monitor handoffs of wireless devices moving among cells of a wireless network in order to detect registration losses and gaps in service. By detecting these errors and possibly correlating them with other errors, persistent network problems can be identified and resolved, resulting in improved service to the wireless devices.

Figure 1:
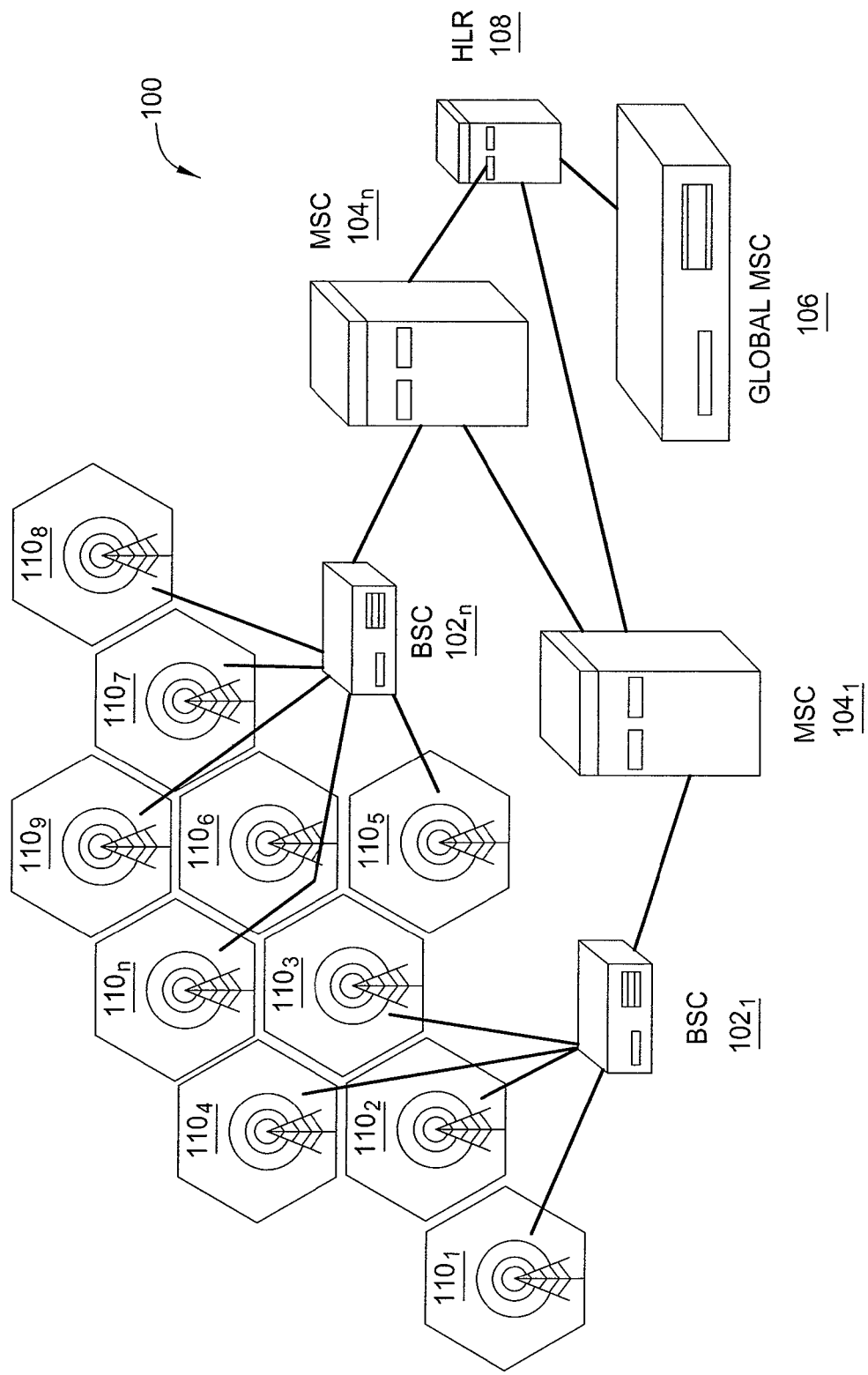
FIG. 1 is a schematic diagram illustrating an exemplary wireless network within which embodiments of the present disclosure may operate.

FIG. 1 is a schematic diagram illustrating an exemplary wireless network 100 within which embodiments of the present disclosure may operate. As illustrated, the network 100 is divided geographically into a plurality of cells $110_1$-$110_n$ (hereinafter collectively referred to as "cells 110"). Each cell 110 is defined by a radio frequency (RF) radiation pattern from a respective base station controller (BSC) $102_1$-$102_n$ (hereinafter collectively referred to as "base station controllers 102"). The BSCs 102 are responsible for handling traffic and signaling between wireless devices and the network switching subsystem (described in further detail below).

Each BSC 102 is, in turn, coupled to a mobile switching center $104_1$-$104_n$ (hereinafter collectively referred to as "mobile switching centers 104"). In typical circuit-switched wireless communication systems, the MSCs connect the landline public switched telephone network (PSTN) system to the wireless network 100. The MSCs 104 are also responsible for authentication, location management, handovers, registration, and the routing of calls to roaming wireless devices.

Each MSC 104 is coupled to a home location register (HLR) 108. The HLR 108 is a central database that stores details (e.g., location information and call details) for each wireless device that is authorized to use the wireless network 100. The HLR 108 is in turn connected to a gateway MSC 106. The gateway MSC 106 is an MSC that determines at which MSC 104 a wireless device that is being called is located. In one embodiment, all mobile-to-mobile and PSTN-to-mobile calls are routed through the gateway MSC 106. As such, the gateway MSC 106 interfaces to the PSTN.

In operation, a wireless device routes communications to an MSC 104 through a serving BSC 102 (i.e., a BSC that is serving the cell 110 in which the wireless device is located). The MSC 104 then routes the communications to another subscribing wireless device via a BSC/base station path or via the PSTN/Internet/other network to the terminating destination.

Between MSCs 104, circuit connections provide the handover mechanism that services calls as wireless devices roam from one cell or service zone to another. The MSC 104 manages all handoff and switching between cells 110, providing commands to each relevant BSC 102 in order to drop the call from the old BSC 102 and set up a new BSC 102.

In particular, the old BSC 102 analyzes a signal from a wireless device indicating that the wireless device wishes to switch to a new cell 110. The BSC 102 reports to its respective MSC 104 (the "anchor MSC," or the MSC from which a handoff is initiated) that that it is currently serving the wireless device. The anchor MSC 104 then performs the necessary control calls with the "target MSC" 104 (i.e., the MSC to which the handoff takes place) that serves the cell to which the wireless device wishes to switch. When the interaction between the anchor MSC 104 and the target MSC 104 is completed successfully, the anchor MSC 104 releases the radio resources for the call to the target MSC 104, and the call is now routed through the target MSC 104.

Errors in the signaling between the BSC 102 and anchor MSC 104 or in the interactions between the anchor MSC 104 and the target MSC 104 may result in a drop of the call, and the user of the wireless device will have to place a new call. As discussed above, these types of errors happen most frequently when the anchor MSC 104 and the target MSC 104 are different (i.e., when the wireless device is attempting to switch between cells 110 that are served by different MSCs 104). For example, referring to FIG. 1, a wireless device traveling between cells $110_1$-$110_4$ or between cells $110_5$-$110_n$ is unlikely to experience many problems. However, a wireless device traveling, for example, from cell $110_3$ to cell $110_5$ will require a series of complicated control messages in order to successfully make a switch (since the cells $110_3$ and $110_5$ are served by different MSCs $104_1$ and $104_n$, respectively). This is where calls may be dropped, and the dropped calls are typically not reported.

Figure 2:
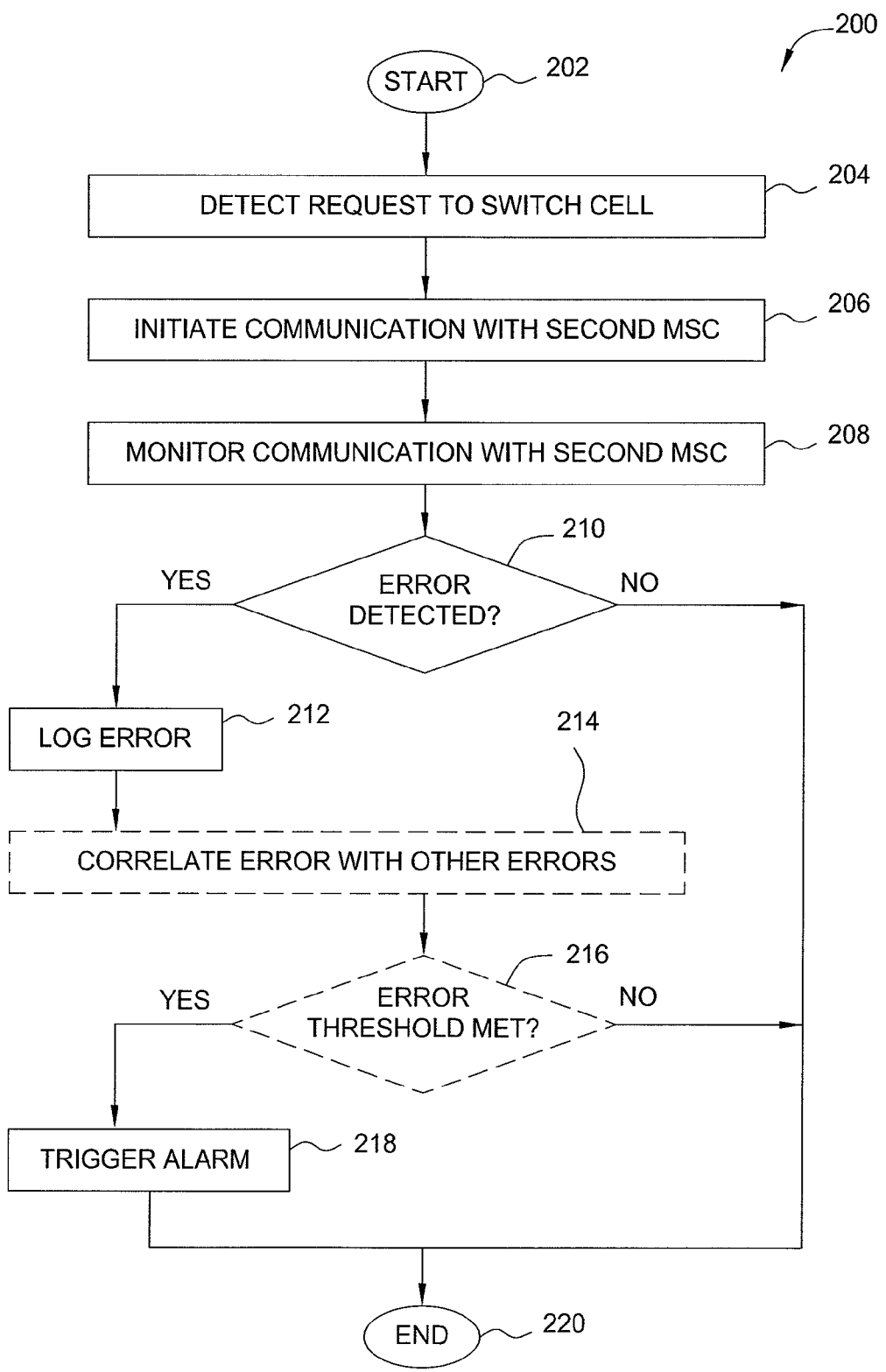
FIG. 2 is a flow diagram illustrating one embodiment of a method for detecting errors in wireless network service.

FIG. 2 is a flow diagram illustrating one embodiment of a method 200 for detecting errors in wireless network service. The method 200 may be implemented, for example by the MSCs 104 illustrated in FIG. 1. As such, reference is made in the discussion of FIG. 2 to various components of the wireless network 100. However, it is noted that the method 200 is not limited by the configuration of the exemplary network 100 and may, in fact, have application in wireless networks having alternate configurations.

The method 200 is initialized in step 202 and proceeds to step 204, where a first MSC $104_1$ detects a request from a wireless device to switch from a current cell to a new cell. The method 200 then proceeds to step 206, where the first MSC $104_1$ initiates a communication with a second MSC $104_n$. In one embodiment, the first MSC $104_1$ is the anchor MSC that serves the current cell, and the second MSC $104_n$ is the target MSC that serves the new cell. In an alternative embodiment, the first MSC $104_1$ is the target MSC, and the second MSC $104_n$ is the anchor MSC.

In step 208, the first MSC $104_1$ monitors the communication with the second MSC $104_n$. Specifically, the first MSC $104_1$ monitors the control messages that are exchanged with the second MSC $104_n$ for the purposes of carrying out the handoff. In step 210, the first MSC $104_1$ determines whether any errors have been detected in the control messages. Such errors may indicate, for example, that the wireless device's call has been dropped in the process of the handoff.

If the first MSC $104_1$ concludes in step 210 that no errors have been detected, then the method 200 terminates in step 220. Alternatively, if the first MSC $104_1$ concludes in step 210 that an error has been detected, the first MSC $104_1$ logs the error in step 212.

In optional step 214 (illustrated in phantom) the first MSC $104_1$ correlates the detected error with other errors that have been previously detected. Correlation of errors results in fewer alarms and allows network administrators to identify sources of repeated errors. The first MSC $104_1$ then determines in optional step 216 (illustrated in phantom) whether correlation of the detected error with the other errors has resulted in a predefined error threshold being met.

If the first MSC $104_1$ concludes in optional step 216 that the error threshold has not been met, then the method 200 terminates in step 220. Alternatively, if the first MSC $104_1$ concludes in optional step 216 that the error threshold has been met, then the first MSC $104_1$ triggers an alarm in step 218. In one embodiment, triggering of an alarm involves notifying a network administrator or technician of the fact that the predefined error threshold has been met. In a further embodiment, the network administrator or technician is also notified of the particular errors that resulted in the predefined error threshold being met (along with any logged information pertaining to the errors).

Once the alarm has been triggered, the method 200 terminates in step 220.

Figure 3:
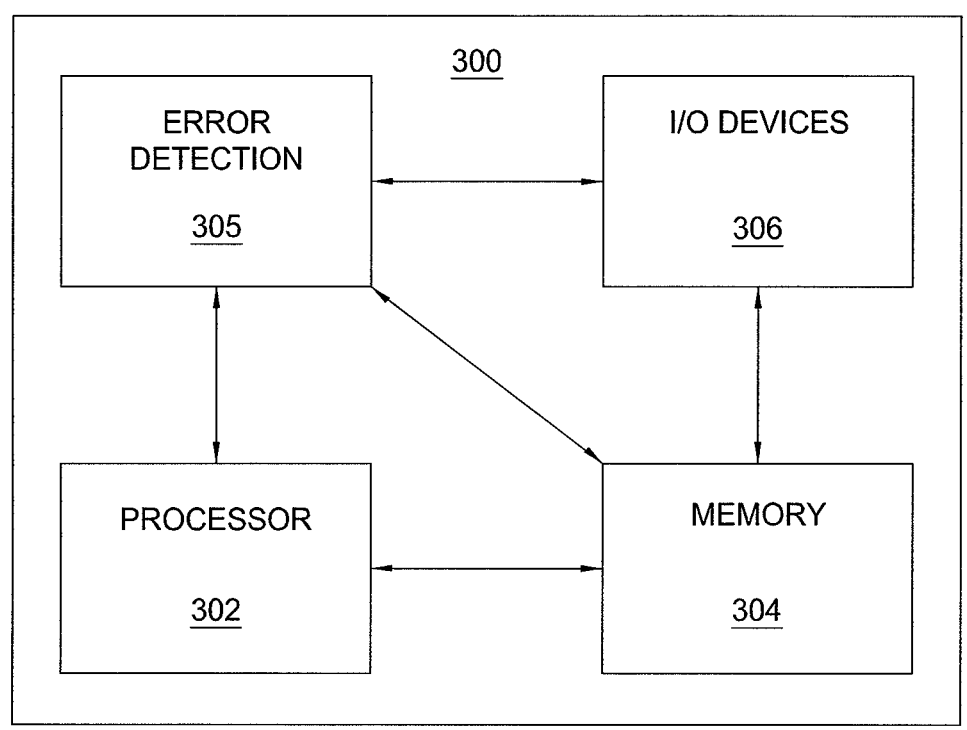
FIG. 3 is a high level block diagram of the error detection method that is implemented using a general purpose computing device.

FIG. 3 is a high level block diagram of the error detection method that is implemented using a general purpose computing device 300. In one embodiment, a general purpose computing device 300 comprises a processor 302, a memory 304, a error detection module 305 and various input/output (I/O) devices 306 such as a display, a keyboard, a mouse, a modem, a stylus, a joystick, a keypad, controller, a sensor, and the like. In one embodiment, at least one I/O device is a storage device (e.g., a disk drive, an optical disk drive, a floppy disk drive). It should be understood that the error detection module 305 can be implemented as a physical device or subsystem that is coupled to a processor through a communication channel.

Alternatively, the error detection module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the error detection module 305 for detecting silent gaps in wireless network service described herein with reference to the preceding Figures can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for correlating an error in a wireless network, comprising:
   receiving, by a processor of a first mobile switching center, a signal from a first base station controller indicating that a wireless device wishes to switch from a first cell to a second cell, wherein the first mobile switching center provides a first command to the first base station controller to drop a call of the wireless device and provides a second command to set up a second base station controller associated with a second mobile switching center;
   initiating, by the processor, a communication with the second mobile switching center;

monitoring, by the processor, a series of control messages exchanged between the first mobile switching center and the second mobile switching center in the wireless network, the series of control messages relating to a handoff of the wireless device being served by the wireless network;

logging, by the processor, the error detected during an exchange of the series of control messages, wherein the error results in the call of the wireless device being dropped during the handoff, wherein the logging comprises recording a time of the error and recording a control message associated with the error;

correlating, by the processor, the error with a previous error detected during a previous exchange of a previous series of control messages that resulted in another call being dropped during another handoff, wherein the correlating identifies a source of repeated errors; and triggering, by the processor, an alarm when the correlating results in a predefined error threshold being met, wherein the triggering comprises notifying a network administrator that the predefined error threshold has been met.

2. The method of claim 1, wherein the first mobile switching center is an anchor mobile switching center that serves the first cell in which the wireless device currently resides, and the second mobile switching center is a target mobile switching center that serves the second cell to which the wireless device wishes to switch.

3. A non-transitory computer readable storage medium storing a plurality of instructions which, when executed by a processor of a first mobile switching center, cause the processor to perform operations for correlating an error in a wireless network, the operations comprising:

receiving a signal from a first base station controller indicating that a wireless device wishes to switch from a first cell to a second cell, wherein the first mobile switching center provides a first command to the first base station controller to drop a call of the wireless device and provides a second command to set up a second base station controller associated with a second mobile switching center;

initiating a communication with the second mobile switching center;

monitoring a series of control messages exchanged between the first mobile switching center and the second mobile switching center in the wireless network, the series of control messages relating to a handoff of the wireless device being served by the wireless network;

logging the error detected during an exchange of the series of control messages, wherein the error results in the call of the wireless device being dropped during the handoff, wherein the logging comprises recording a time of the error and recording a control message associated with the error;

correlating the error with a previous error detected during a previous exchange of a previous series of control messages that resulted in another call being dropped during another handoff, wherein the correlating identifies a source of repeated errors; and triggering an alarm when the correlating results in a predefined error threshold being met, wherein the triggering comprises notifying a network administrator that the predefined error threshold has been met.

4. The non-transitory computer readable storage medium of claim 3, wherein the first mobile switching center is an anchor mobile switching center that serves the first cell in which the wireless device currently resides, and the second mobile switching center is a target mobile switching center that serves the second cell to which the wireless device wishes to switch.

5. An apparatus for correlating an error in a wireless network, comprising:

a processor of a first mobile switching center; and a non-transitory computer-readable medium storing a plurality of instructions which, when executed by the processor, cause the processor to perform operations, the operations comprising:

receiving a signal from a first base station controller indicating that a wireless device wishes to switch from a first cell to a second cell, wherein the first mobile switching center provides a first command to the first base station controller to drop a call of the wireless device and provides a second command to set up a second base station controller associated with a second mobile switching center;

initiating a communication with the second mobile switching center;

monitoring a series of control messages exchanged between the first mobile switching center and the second mobile switching center in the wireless network, the series of control messages relating to a handoff of the wireless device being served by the wireless network;

logging the error detected during an exchange of the series of control messages, wherein the error results in the call of the wireless device being dropped during the handoff, wherein the logging comprises recording a time of the error and recording a control message associated with the error;

correlating the error with a previous error detected during a previous exchange of a previous series of control messages that resulted in another call being dropped during another handoff, wherein the correlating identifies a source of repeated errors; and triggering an alarm when the correlating results in a predefined error threshold being met, wherein the triggering comprises notifying a network administrator that the predefined error threshold has been met.

* * * * *